United States Patent
Guo et al.

(10) Patent No.: US 11,482,748 B2
(45) Date of Patent: Oct. 25, 2022

(54) BATTERY CAP ASSEMBLY AND SECONDARY BATTERY

(71) Applicant: CONTEMPORARY AMPEREX TECHNOLOGY CO., LIMITED, Ningde (CN)

(72) Inventors: Zhijun Guo, Ningde (CN); Jie Zhang, Ningde (CN); Taosheng Zhu, Ningde (CN); Peng Wang, Ningde (CN); Guowei Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 354 days.

(21) Appl. No.: 15/974,485

(22) Filed: May 8, 2018

(65) Prior Publication Data

US 2019/0115612 A1    Apr. 18, 2019

(30) Foreign Application Priority Data

Oct. 17, 2017 (CN) .......................... 201710966467.5

(51) Int. Cl.
  *H01M 50/184* (2021.01)
  *H01M 10/04* (2006.01)
  (Continued)

(52) U.S. Cl.
  CPC ....... *H01M 50/184* (2021.01); *H01M 10/045* (2013.01); *H01M 50/116* (2021.01);
  (Continued)

(58) Field of Classification Search
  None
  See application file for complete search history.

(56) References Cited

U.S. PATENT DOCUMENTS

| 5,510,203 A * | 4/1996 | Hamada | H01M 10/6562 |
| | | | 429/151 |
| 2011/0236732 A1* | 9/2011 | Meehan | H01M 2/0473 |
| | | | 429/53 |

(Continued)

FOREIGN PATENT DOCUMENTS

| CN | 102683734 A | 9/2012 |
| CN | 203503714 U | 3/2014 |

(Continued)

OTHER PUBLICATIONS

Contemporary Amperex Technology Co., Limited, Extended European Search Report, EP 18170601.1, Jun. 15, 2018, 6 pgs.

(Continued)

*Primary Examiner* — Ula C Ruddock
*Assistant Examiner* — Tony S Chuo
(74) *Attorney, Agent, or Firm* — Morgan, Lewis & Bockius LLP

(57) ABSTRACT

The present disclosure provides a battery cap assembly and a secondary battery. The battery cap assembly comprises a cap plate, a first electrode terminal and a first connecting piece. The cap plate is made of insulating material and includes a first terminal hole; the first electrode terminal is provided to the cap plate and extends into the first terminal hole; the first connecting piece is provided below the cap plate. The first connecting piece includes a first connecting portion connected with the first electrode terminal, an upper surface of the first connecting portion is attached to the cap plate. The secondary battery comprises an electrode assembly, a case and the battery cap assembly. The case receives the electrode assembly and has an opening. The cap plate is connected with the case, the first connecting portion of the first connecting piece is electrically connected with the first electrode plate.

7 Claims, 4 Drawing Sheets

(51) Int. Cl.
     *H01M 50/50*      (2021.01)
     *H01M 50/116*     (2021.01)
     *H01M 50/147*     (2021.01)
     *H01M 50/183*     (2021.01)
     *H01M 50/543*     (2021.01)

(52) U.S. Cl.
     CPC ....... *H01M 50/147* (2021.01); *H01M 50/183* (2021.01); *H01M 50/50* (2021.01); *H01M 50/543* (2021.01)

(56) References Cited

U.S. PATENT DOCUMENTS

2012/0237817 A1\* 9/2012 Kim ................. H01M 2/30
                                                   429/158
2017/0040579 A1\* 2/2017 Guen ................ H01M 2/043

FOREIGN PATENT DOCUMENTS

| CN | 102130319 B | 8/2015 |
| CN | 106058139 A | 10/2016 |
| CN | 106450407 A | 2/2017 |
| EP | 0072123 A2 | 2/1983 |
| EP | 0773596 A1 | 5/1997 |
| EP | 2838138 A1 | 2/2015 |

OTHER PUBLICATIONS

Contemporary Amperex Technology Co., Limited, First Office Action, CN201710966467.5, Feb. 19, 2021, 12 pgs.

\* cited by examiner

BATTERY CAP ASSEMBLY AND SECONDARY BATTERY

CROSS-REFERENCE TO RELATED APPLICATIONS

The present application claims priority to Chinese patent application No. CN201710966467.5, filed on Oct. 17, 2017, which is incorporated herein by reference in its entirety.

FIELD OF THE PRESENT DISCLOSURE

The present disclosure relates to the field of battery, and particularly relates to a battery cap assembly and a secondary battery.

BACKGROUND OF THE PRESENT DISCLOSURE

At present, a secondary battery generally comprises a case, an electrode assembly received in the case and a cap plate sealing the case. The electrode assembly is generally electrically connected with an electrode terminal protruding to the outside of the cap plate via a connecting piece, thereby realizing charge and discharge. However, the cap plate is mostly made of conductive metal at present; considering the strength, the seal and the insulation of the secondary battery, an insulating member needs to be provided between the cap plate and the connecting piece, which can avoid the connecting piece being in contact with the cap plate (if the connecting piece is in contact with the cap plate, a positive electrode plate and a negative electrode plate of the electrode assembly may be conductive via the connecting piece and the cap plate, which leads to short circuit). However, the structure of the secondary battery is complex due to provision of the insulating member. At the same time, the energy density of the secondary battery will be reduced due to the space occupied by the insulating member.

SUMMARY OF THE PRESENT DISCLOSURE

In view of the problem existing in the background, an object of the present disclosure is to provide a battery cap assembly and a secondary battery, which can decrease the space occupied by the battery cap assembly and improve the energy density of the secondary battery.

In order to achieve the above object, in a first aspect, the present disclosure provides a battery cap assembly, which comprises a cap plate, a first electrode terminal and a first connecting piece. The cap plate is made of insulating material and includes a first terminal hole; the first electrode terminal is provided to the cap plate and extends into the first terminal hole; the first connecting piece is provided below the cap plate. The first connecting piece includes a first connecting portion connected with the first electrode terminal, and an upper surface of the first connecting portion is attached to the cap plate.

In order to achieve the above object, in a second aspect, the present disclosure provides a secondary battery, which comprises an electrode assembly, a case and the battery cap assembly according to the first aspect of the present disclosure. The electrode assembly comprises a first electrode plate, a second electrode plate and a separator provided between the first electrode plate and the second electrode plate. The case receives the electrode assembly and has an opening in a top thereof. The cap plate is connected with the case at the opening, and the first connecting portion of the first connecting piece is electrically connected with the first electrode plate.

The present disclosure has the following beneficial effects: in the battery cap assembly and the secondary battery according to the present disclosure, because the cap plate is made of the insulating material, the first connecting portion electrically connecting the first electrode terminal and the first electrode plate can be directly attached to the cap plate, and there is no need to provide an insulating member between the first connecting portion and the cap plate, thereby decreasing the space occupied by the battery cap assembly and improving the energy density of the secondary battery.

Figure 1:
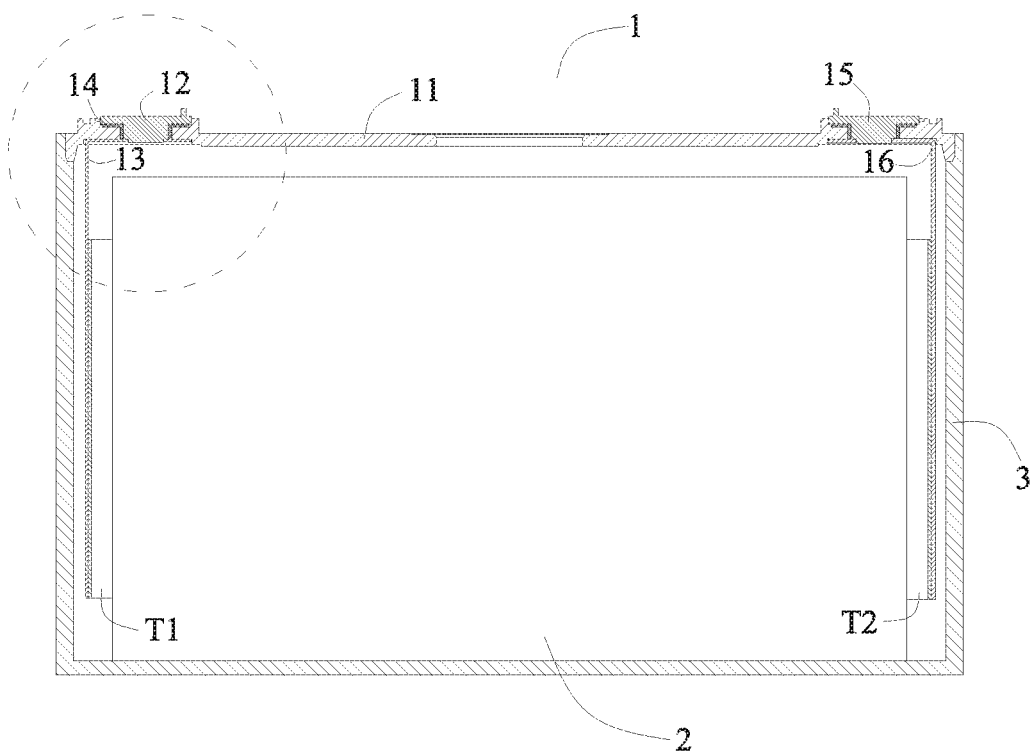
FIG. 1 is a schematic view of an embodiment of a secondary battery according to the present disclosure.

Reference numerals in figures are represented as follows:
1 battery cap assembly
  11 cap plate
    111 first terminal hole
    112 first groove
    113 lower groove
    114 second groove
  12 first electrode terminal
    121 first base portion
    122 first protruding portion
    123 stripe protrusion
    124 boss
  13 first connecting piece
    131 first connecting portion
      1311 first fitting hole
    132 first extending portion
  14 sealing gasket
    141 main portion
    142 column portion
  15 second electrode terminal
  16 second connecting piece
    161 second connecting portion
    162 second extending portion
2 electrode assembly
3 case
T1 first electrode tab
T2 second electrode tab

DETAILED DESCRIPTION

Hereinafter a battery cap assembly and a secondary battery according to the present disclosure will be described in detail in combination with the figures.

Firstly, a battery cap assembly according to a first aspect of the present disclosure will be described.

Referring to FIGS. 1-8, a battery cap assembly 1 according to the present disclosure comprises a cap plate 11, a first electrode terminal 12 and a first connecting piece 13. The cap plate 11 is made of insulating material and includes a first terminal hole 111; the first electrode terminal 12 is provided to the cap plate 11 and extends into the first terminal hole 111; the first connecting piece 13 is provided below the cap plate 11. The first connecting piece 13 includes a first connecting portion 131 connected with the first electrode terminal 12, and an upper surface of the first connecting portion 131 is attached to the cap plate 11.

In the battery cap assembly 1 according to the present disclosure, because the cap plate 11 is made of the insulating material, the first connecting portion 131 of the first connecting piece 13 can be directly attached to the cap plate 11, and there is no need to provide an insulating member between the first connecting portion 131 and the cap plate 11, thereby decreasing the space occupied by the battery cap assembly 1.

Figure 4:
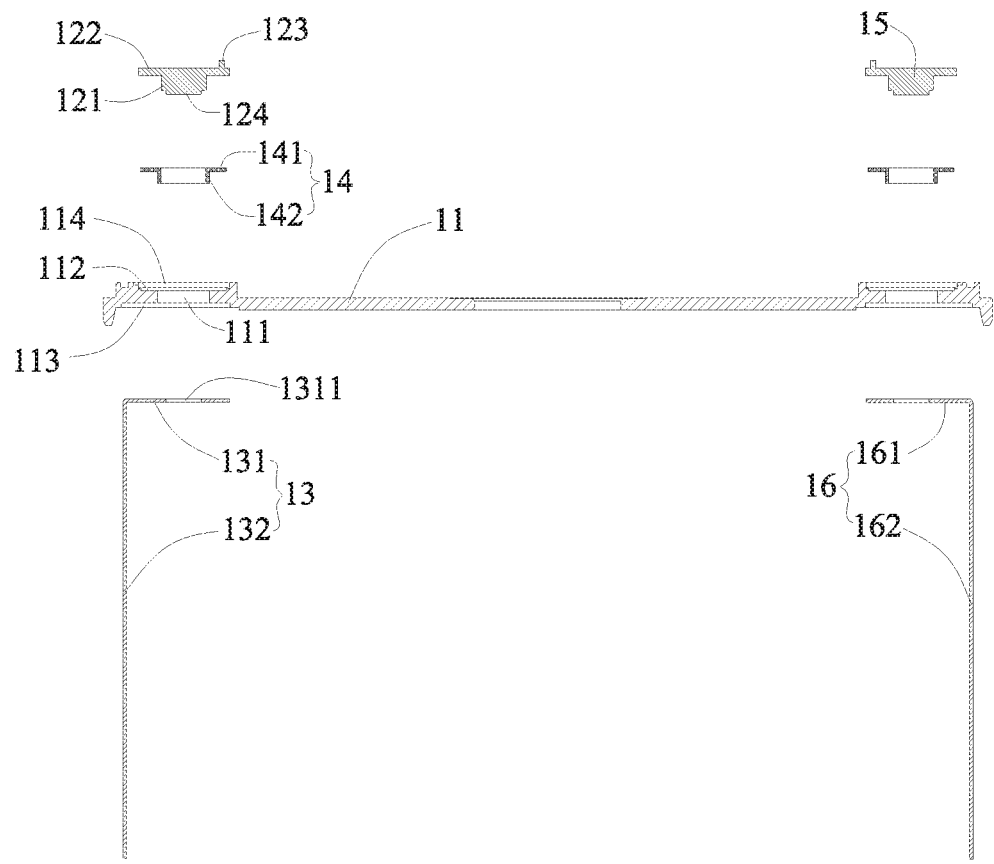
FIG. 4 is another schematic view of the battery cap assembly of FIG. 1.
Figure 5:
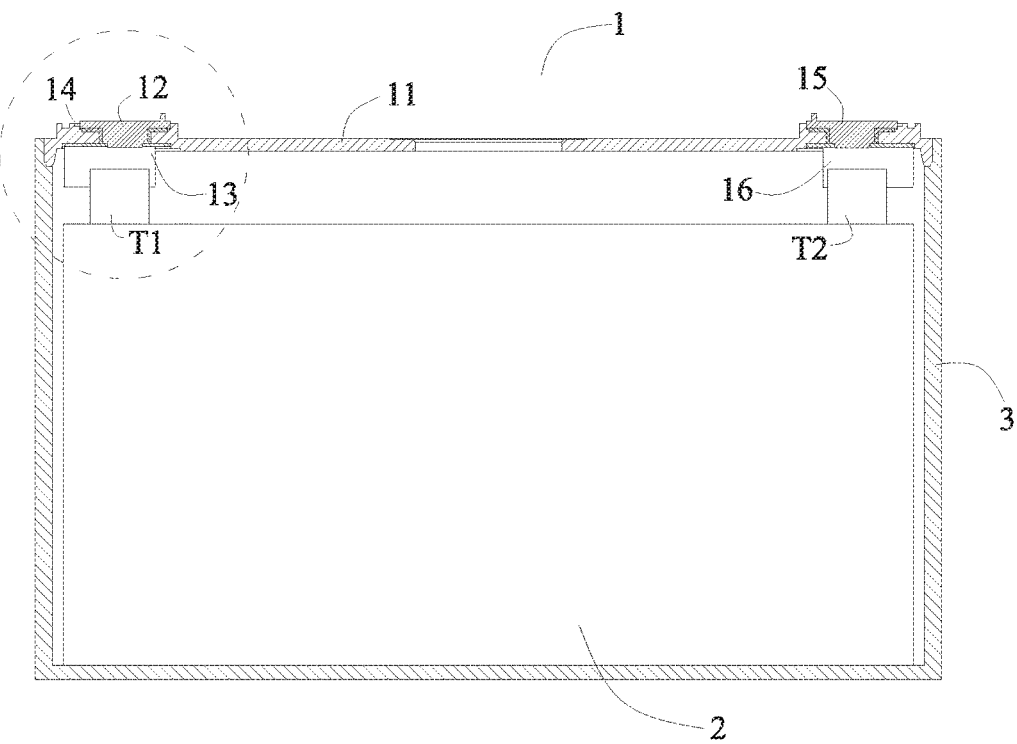
FIG. 5 is a schematic view of another embodiment of the secondary battery according to the present disclosure.
Figure 8:
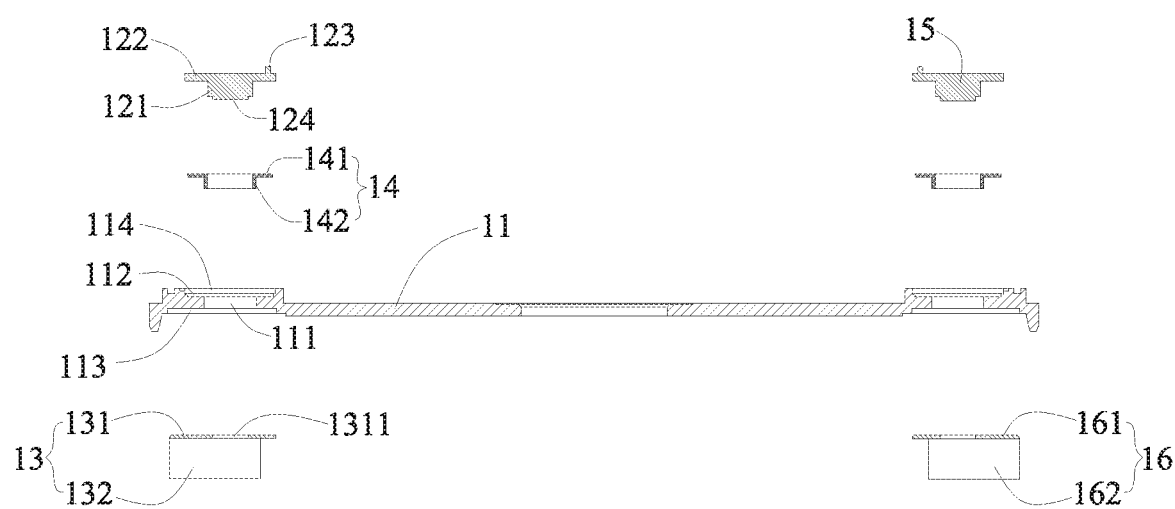
FIG. 8 is another schematic view of the battery cap assembly of FIG. 6.

Referring to FIG. 4 and FIG. 8, the first electrode terminal 12 includes a first protruding portion 122 and a first base portion 121. The first protruding portion 122 protrudes above the cap plate 11, and the first base portion 121 is connected with the first connecting piece 13 and extends into the first terminal hole 111, and a cross-sectional area of the first protruding portion 122 is larger than a cross-sectional area of the first terminal hole 111. The first protruding portion 122 protrudes above the cap plate 11 to be conveniently connected with an external member, such as a bus bar; the first base portion 121 passes through the cap plate 11 via the first terminal hole 111, so that the first base portion 121 can be securely connected with the first connecting portion 131 of the first connecting piece 13 below the cap plate 11 conveniently. At the same time, because the cross-sectional area of the first protruding portion 122 is larger than the cross-sectional area of the first terminal hole 111, the first protruding portion 122 can be clamped above the first terminal hole 111, thereby avoiding the first protruding portion 122 of the first electrode terminal 12 passing through the first terminal hole 111.

Referring to FIG. 4 and FIG. 8, a stripe protrusion 123 extending along a width direction of the cap plate 11 may be provided on an upper surface of the first protruding portion 122.

Referring to FIG. 4 and FIG. 8, the cap plate 11 includes a lower groove 113 at a lower side, and the first connecting portion 131 is received in the lower groove 113, and the first terminal hole 111 is provided to a bottom surface of the lower groove 113. It can further decrease the height occupied by the battery cap assembly 1 and improve energy density of a secondary battery including the battery cap assembly 1 of the present disclosure by providing the lower groove 113 in the cap plate 11. A depth of the lower groove 113 can be smaller than a thickness of the first connecting portion 131, so a part of the first connecting portion 131 is received in the lower groove 113; preferably, the depth of the lower groove 113 can be larger than the thickness of the first connecting portion 131, so the first connecting portion 131 is completely received in the lower groove 113, thereby maximally saving space.

Figure 2:
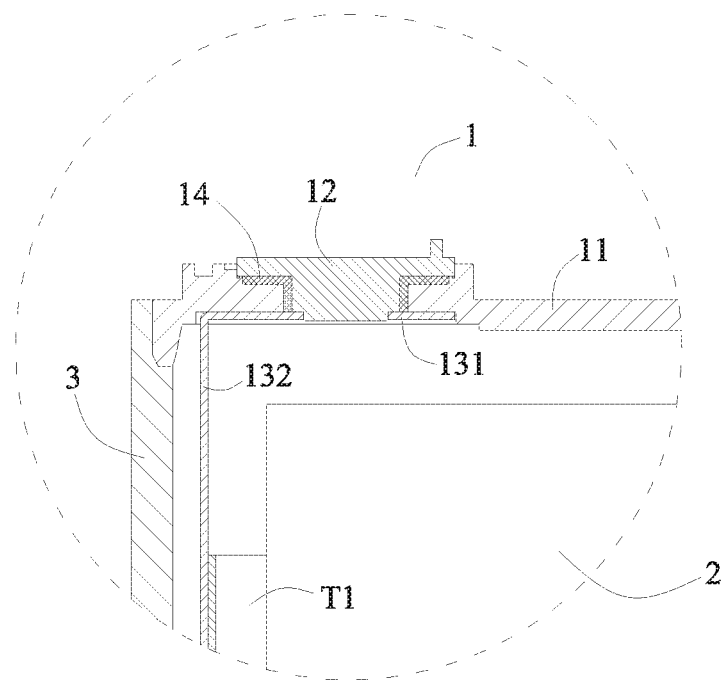
FIG. 2 is an enlarged view of a part of FIG. 1 surrounded by a circle.
Figure 3:
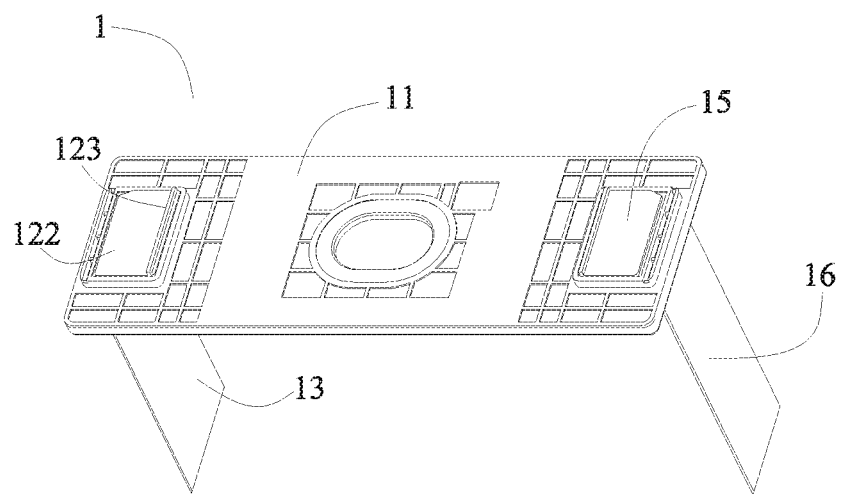
FIG. 3 is a schematic view of a battery cap assembly of FIG. 1.
Figure 6:
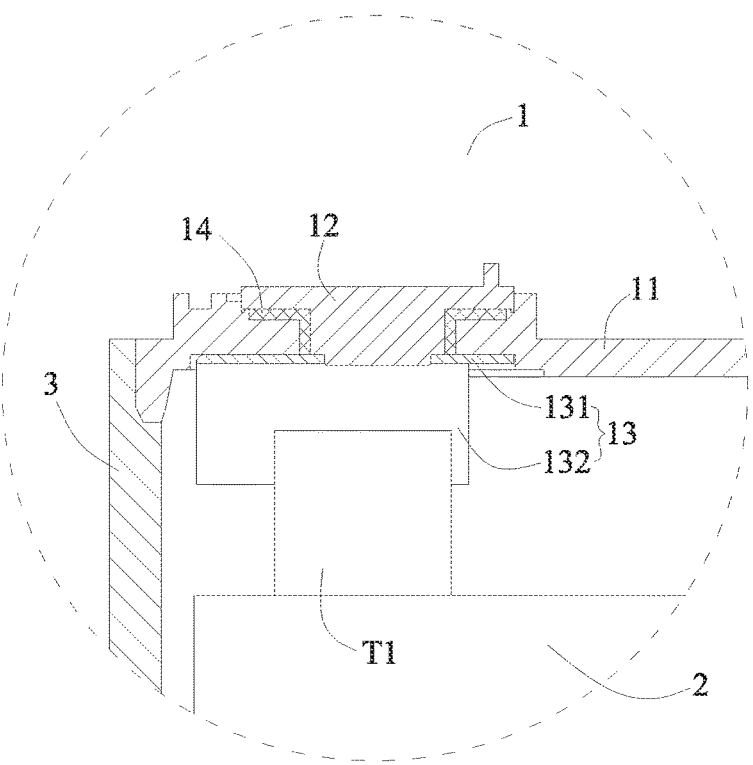
FIG. 6 is an enlarged view of a part of FIG. 5 surrounded by a circle.
Figure 7:
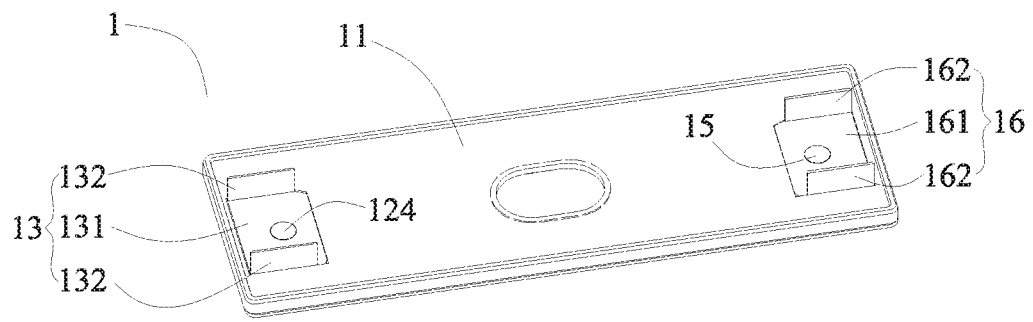
FIG. 7 is a schematic view of a battery cap assembly of FIG. 6.

Referring to FIG. 2 and FIG. 6, a lower surface of the first base portion 121, the bottom surface of the lower groove 113 and the upper surface of the first connecting portion 131 are flush with each other. The first terminal hole 111 is provided to the bottom surface of the lower groove 113, and the upper surface of the first connecting portion 131 abuts on the bottom surface of the lower groove 113, so the lower surface of the first base portion 121 can be directly connected with the first connecting portion 131 after passing through the first terminal hole 111. The way that the three surfaces are flush with each other can decrease the height occupied by the battery cap assembly 1.

Referring to FIG. 4 and FIG. 8, the first connecting portion 131 includes a first fitting hole 1311; the first electrode terminal 12 further includes a boss 124, and the boss 124 extends downwardly from the lower surface of the first base portion 121 and extends into the first fitting hole 1311, and the lower surface of the first base portion 121 is attached to the upper surface of the first connecting portion 131. A fit between the first fitting hole 1311 and the boss 124 facilitates the welding of the first connecting portion 131 and the first electrode terminal 12, which can improve the connecting strength between the first connecting piece 13 and the first electrode terminal 12. A cross-sectional area of the boss 124 is smaller than a cross-sectional area of the first base portion 121. The first fitting hole 1311 is fitted with the boss 124, and the cross-sectional area of the first base portion 121 is larger than the cross-sectional area of the boss 124, so when the first electrode terminal 12 is assembled, the first base portion 121 will be clamped by the first connecting portion 131 and cannot pass through the first fitting hole 1311. In other words, the structure of the boss 124 has a positioning function in the assembling process.

Referring to FIG. 2, FIG. 4, FIG. 6 and FIG. 8, the battery cap assembly 1 further comprises a sealing gasket 14, and the sealing gasket 14 includes a main portion 141, and the main portion 141 is positioned between the first protruding portion 122 and the cap plate 11. When the first connecting piece 13 and the first electrode terminal 12 are welded together, the first protruding portion 122 will press the main portion 141 of the sealing gasket 14 from above, thereby sealing the first terminal hole 111 of the cap plate 11. The sealing gasket 14 further includes a column portion 142 extending into the first terminal hole 111, and the column portion 142 extends downwardly from a middle part of the main portion 141 and is interposed between the first base portion 121 and a wall of the first terminal hole 111. The column portion 142 has a positioning function, which can easily realize the assembly of the first electrode terminal 12.

Referring to FIG. 2, FIG. 4, FIG. 6 and FIG. 8, the cap plate 11 includes a first groove 112 having a predetermined depth and being along a periphery of the first terminal hole 111, and at least a part of the main portion 141 of the sealing gasket 14 is received in the first groove 112. Because at least a part of the main portion 141 of the sealing gasket 14 is received in the first groove 112, it can decrease the height occupied by the battery cap assembly 1 and improve the energy density of the secondary battery including the battery cap assembly 1 of the present disclosure. Preferably, the main portion 141 of the sealing gasket 14 is completely received in the first groove 112.

Further, referring to FIG. 2, FIG. 4, FIG. 6 and FIG. 8, the cap plate 11 further includes a second groove 114 having a predetermined depth from a bottom surface of the first groove 112 and being along the periphery of the first terminal hole 111. A cross-sectional area of the first groove 112 is smaller than a cross-sectional area of the second groove 114, and at least a part of the first protruding portion 122 is received in the second groove 114. Because at least a part of the first protruding portion 122 of the first electrode terminal 12 is received in the first groove 112, it also can decrease the height of the battery cap assembly 1 occupied by the first electrode terminal 12. The cross-sectional area of the first groove 112 is smaller than the cross-sectional area of the second groove 114, so there is a step formed by the first groove 112 and the second groove 114; preferably, the cross-sectional area of the first protruding portion 122 is larger than the cross-sectional area of the first groove 112, so when the first electrode terminal 12 is assembled, the first protruding portion 122 will be clamped by the step which has a positioning function in the assembling process.

Referring to FIG. 4 and FIG. 8, the first connecting piece 13 further includes a first extending portion 132 extending downwardly from an end of the first connecting portion 131.

In the battery cap assembly 1 according to the present disclosure, referring to FIG. 4 and FIG. 8, the battery cap assembly 1 further comprises a second electrode terminal 15 and a second connecting piece 16, and the second electrode terminal 15 is provided to the cap plate 11, and the second connecting piece 16 is provided below the cap plate 11 and includes a second connecting portion 161 connected with the second electrode terminal 15, and an upper surface of the second connecting portion 161 is attached to the cap plate 11. The second electrode terminal 15 and the first electrode terminal 12 can have the same structure; correspondingly, the cap plate 11 also has a hole corresponding to the second electrode terminal 15 and a groove corresponding to the second electrode terminal 15.

The second connecting piece 16 further includes a second extending portion 162 extending downwardly from an end of the second connecting portion 161.

Secondly, a secondary battery according to a second aspect of the present disclosure will be described.

Referring to FIGS. 1-8, a secondary battery according to the present disclosure comprises an electrode assembly 2, a case 3 and the battery cap assembly 1 according to the first aspect of the present disclosure. The electrode assembly 2 comprises a first electrode plate, a second electrode plate and a separator provided between the first electrode plate and the second electrode plate. The case 3 receives the electrode assembly 2 and has an opening in a top thereof. The cap plate 11 of the battery cap assembly 1 is connected with the case 3 at the opening, and the first connecting portion 131 of the first connecting piece 13 is electrically connected with the first electrode plate.

The electrode assembly 2 can be charged and discharged via the first electrode terminal 12 and the second electrode terminal 15.

In the secondary battery according to the present disclosure, because the cap plate 11 is made of the insulating material, the first connecting portion 131 electrically connecting the first electrode terminal 12 and the first electrode plate can be directly attached to the cap plate 11, and there is no need to provide the insulating member between the first connecting portion 131 and the cap plate 11, thereby decreasing the space occupied by the battery cap assembly 1 and improving the energy density of the secondary battery.

The first electrode plate and the second electrode plate of the electrode assembly 2 are plates formed by coating active material on metal foils. The separator is used for separating the first electrode plate and the second electrode plate. In an embodiment, the first electrode plate, the second electrode plate and the separator are wound together; in another embodiment, the first electrode plate and the second electrode plate are laminated alternately, and the separator is interposed between the first electrode plate and the second electrode plate.

The electrode assembly 2 is provided as one or multiple in number. When the electrode assembly 2 is provided as multiple in number, referring to FIG. 7, two ends of the first connecting portion 131 each are provided with the first extending portion 132.

The case 3 is made of insulating material and connected with the cap plate 11 by hot melt. A cavity formed in the case 3 receives the electrode assembly 2, and the electrode assembly 2 can be easily assembled to the cavity via the opening formed in the top of the case 3. A shape of the electrode assembly 2 is similar to a shape of the case 3.

The second connecting portion 161 of the second connecting piece 16 is electrically connected with the second electrode plate of the electrode assembly 2.

In the secondary battery according to the present disclosure, referring to FIG. 2 and FIG. 6, preferably, the first connecting portion 131 of the first connecting piece 13 and the second connecting portion 161 of the second connecting piece 16 are directly attached to the cap plate 11, which can further decrease a distance between the cap plate 11 and the electrode assembly 2, thereby saving interior space of the secondary battery and improving the energy density of the secondary battery. Because the cap plate 11 is made of the insulating material, short circuit will not occur even if the first connecting portion 131 of the first connecting piece 13 and the second connecting portion 161 of the second connecting piece 16 are attached to the cap plate 11 at the same time.

In the secondary battery according to the present disclosure, referring to FIG. 2 and FIG. 6, the electrode assembly 2 further comprises a first electrode tab T1 connected with the first electrode plate and a second electrode tab T2 connected with the second electrode plate, and the first extending portion 132 of the first connecting piece 13 can be securely connected with the first electrode tab T1 of the electrode assembly 2 directly; the second extending portion 162 of the second connecting piece 16 can be securely connected with the second electrode tab T2 directly. Specifically, in an embodiment, referring to FIG. 1, the first electrode tab T1 and the second electrode tab T2 are respectively provided in two ends of the electrode assembly 2 in a length direction. The first extending portion 132 of the first connecting piece 13 and the second extending portion 162 of the second connecting piece 16 respectively extend to two sides of the electrode assembly 2 in the length direction and are respectively securely connected with the first electrode tab T1 and the second electrode tab T2. In another embodiment, referring to FIG. 5, the first electrode tab T1 and the second electrode tab T2 are provided in the top of the electrode assembly 2. At this time, a difference of height between the first connecting portion 131 and the first electrode tab T1 is small, so the first connecting portion 131 of the first connecting piece 13 can be directly fixed to the first electrode tab T1, which can omit the first extending portion 132; certainly, the first connecting piece 13 also can be securely connected with the first electrode tab T1 by providing the first extending portion 132. The second connecting piece 16 and the first connecting piece 13 can have the same structure.

A plurality of secondary batteries of the present disclosure can be connected to form a battery module via bus bars, and the first protruding portion 122 protruding above the cap plate 11 can be conveniently welded with the bus bar. In the prior art, the first electrode terminal 12 and the bus bar are generally connected by penetration welding; if the penetration welding is used, the first electrode terminal needs to have a sufficient height. However, in the present disclosure, the stripe protrusion 123 on the upper surface of the first protruding portion 122 can be fixed to bus bar by butt welding, thereby reducing the height of the first electrode terminal 12 and improving the energy density of the secondary battery.

What is claimed is:

1. A secondary battery, comprising:
an electrode assembly comprising a first electrode plate, a second electrode plate and a separator provided between the first electrode plate and the second electrode plate;
a case receiving the electrode assembly and having an opening in a top thereof; and a battery cap assembly;
wherein the battery cap assembly comprises a cap plate in one piece, a first electrode terminal and a first connecting piece; the cap plate is made of insulating material and includes a first terminal hole; the first electrode terminal is provided to the cap plate and extends into the first terminal hole; the first connecting piece is provided below the cap plate;
the first electrode terminal includes a first protruding portion and a first base portion, the first protruding portion protrudes above the cap plate, the first base portion is connected to the first connecting piece and extends into the first terminal hole, and a cross-sectional area of the first protruding portion is larger than a cross-sectional area of the first terminal hole;
the battery cap assembly further comprises a sealing gasket in one piece, the sealing gasket is composed of a main portion and a column portion, the main portion is positioned between the first protruding portion and the cap plate, the column portion extends downwardly from a middle part of the main portion and extends into the first terminal hole, the column portion is interposed between the first base portion and a wall of the first terminal hole;
the first connecting piece includes a first connecting portion connected to the first electrode terminal, and an upper surface of the first connecting portion is directly attached to the cap plate;
the cap plate is connected to the case at the opening, and the first connecting portion of the first connecting piece is electrically connected to the first electrode plate;
the cap plate includes a lower groove at a lower side, and the first connecting portion is received in the lower groove, the first terminal hole is provided to a bottom surface of the lower groove;
a bottom surface of the first base portion, a bottom surface of the column portion, a bottom surface of the lower groove and the upper surface of the first connecting portion are flush with each other; and
an outer surface of the cap plate is a part of an outer surface of the secondary battery.

2. The secondary battery according to claim 1, wherein a stripe protrusion extending along a width direction of the cap plate is provided on an upper surface of the first protruding portion.

3. The secondary battery according to claim 1, wherein the cap plate includes a first groove having a predetermined depth and being along a periphery of the first terminal hole, and at least a part of the main portion of the sealing gasket is received in the first groove.

4. The secondary battery according to claim 3, wherein the cap plate further includes a second groove having a predetermined depth from a bottom surface of the first groove and being along the periphery of the first terminal hole;
a cross-sectional area of the first groove is smaller than a cross-sectional area of the second groove, and at least a part of the first protruding portion is received in the second groove.

5. The secondary battery according to claim 1, wherein the first connecting piece further includes a first extending portion extending downwardly from an end of the first connecting portion.

6. The secondary battery according to claim 1, wherein the first connecting portion includes a first fitting hole;
the first electrode terminal further includes a boss, the boss extends downwardly from a lower surface of the first base portion and extends into the first fitting hole, and the lower surface of the first base portion is attached to the upper surface of the first connecting portion.

7. The secondary battery according to claim 6, wherein a cross-sectional area of the boss is smaller than a cross-sectional area of the first base portion.

* * * * *